US010589783B2

(12) United States Patent
Allan et al.

(10) Patent No.: US 10,589,783 B2
(45) Date of Patent: Mar. 17, 2020

(54) SYSTEMS AND METHODS FOR AUTOMATICALLY DETERMINING AN AUTONOMOUS STEERING SYSTEM CENTER

(71) Applicant: GM GLOBAL TECHNOLOGY OPERATIONS LLC, Detroit, MI (US)

(72) Inventors: Alexander M. Allan, Brighton, MI (US); Addney T. Biery, II, Clio, MI (US); Paul A. Kilmurray, Wixom, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 65 days.

(21) Appl. No.: 15/938,165

(22) Filed: Mar. 28, 2018

(65) Prior Publication Data

US 2019/0300052 A1 Oct. 3, 2019

(51) Int. Cl.
| | |
|---|---|
| *B62D 15/02* | (2006.01) |
| *B62D 6/10* | (2006.01) |
| *B60W 50/029* | (2012.01) |
| *H04L 12/40* | (2006.01) |

(52) U.S. Cl.
CPC ........... *B62D 15/0245* (2013.01); *H04L 2012/40215* (2013.01); *H04L 2012/40273* (2013.01)

(58) Field of Classification Search
CPC ........ B62D 15/0245; B62D 6/10; B62D 5/06; B62D 15/02; B62D 5/04; B62D 6/02; B62D 6/00; B62D 11/04; G01B 11/275; G06F 7/00; A01B 69/00; B60W 50/029
See application file for complete search history.

(56) References Cited

U.S. PATENT DOCUMENTS

| | | | | |
|---|---|---|---|---|
| 3,850,258 A | * | 11/1974 | Bauer | B62D 11/183 180/6.48 |
| 5,758,740 A | * | 6/1998 | Park | B62D 7/1509 180/442 |
| 9,227,660 B1 | * | 1/2016 | Bebernes | B62D 6/02 |
| 2002/0050417 A1 | * | 5/2002 | Berg | G01D 5/2033 180/446 |

(Continued)

FOREIGN PATENT DOCUMENTS

DE 102011120672 A1 * 7/2012 ......... B62D 15/0215

*Primary Examiner* — Yuri Kan
(74) *Attorney, Agent, or Firm* — Lorenz & Kopf, LLP

(57) ABSTRACT

A method for performing operations onboard a vehicle is provided. The method obtains a steering calibration command, by a computing device communicatively coupled to a steering mechanism for the vehicle; initiates execution of the steering calibration command, by the computing device via the steering mechanism; determines at least one maximum steering angle of the vehicle, based on execution of the steering calibration command, the at least one maximum steering angle being associated with a maximum potential position of the steering mechanism; identifies a zero-position center of the steering mechanism, based on the at least one maximum steering angle of the vehicle; stores the zero-position center and the at least one maximum steering angle, by the computing device, for future use; and broadcasts the zero-position center and the at least one maximum steering angle, via a Controller Area Network (CAN) bus of the vehicle, by the communication device.

20 Claims, 5 Drawing Sheets

(56) References Cited

U.S. PATENT DOCUMENTS

| | | | |
|---|---|---|---|
| 2002/0095981 A1* | 7/2002 | Dry | G01B 11/275 |
| | | | 73/146 |
| 2013/0018550 A1* | 1/2013 | Kim | B62D 5/04 |
| | | | 701/41 |
| 2013/0054074 A1* | 2/2013 | Schreiber | B62D 5/0457 |
| | | | 701/23 |
| 2015/0217801 A1* | 8/2015 | Takeda | B62D 6/008 |
| | | | 701/42 |
| 2016/0037706 A1* | 2/2016 | Bebernes | A01B 69/007 |
| | | | 180/403 |
| 2016/0037707 A1* | 2/2016 | Bebernes | A01B 69/007 |
| | | | 180/6.48 |
| 2016/0039452 A1* | 2/2016 | Rotole | B62D 5/09 |
| | | | 180/414 |
| 2016/0039453 A1* | 2/2016 | Bebernes | A01B 69/008 |
| | | | 701/41 |
| 2018/0201310 A1* | 7/2018 | Rotole | B62D 1/286 |
| 2018/0229738 A1* | 8/2018 | Nilsson | B60W 50/029 |

\* cited by examiner

SYSTEMS AND METHODS FOR AUTOMATICALLY DETERMINING AN AUTONOMOUS STEERING SYSTEM CENTER

INTRODUCTION

Embodiments of the subject matter described herein relate generally to the automated identification of wheel turning angles. More particularly, embodiments of the subject matter relate to automatically identifying and storing a straight-ahead wheel position of a vehicle that includes no turn angle.

A vehicle generally uses a functional range of travel to perform turning operations with an integrated, electronic steering mechanism. Electronic steering systems need to have a zero-position set (trim or learn) in the software. This is traditionally done by manually aligning the steering wheel and using software to store the value. In some instances, for example, when a steering wheel is not provided, manual alignment is not available.

Accordingly, it is desirable to identify a range of travel and/or an absolute center steering position using methods other than manually via a steering wheel. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for performing operations onboard a vehicle. The method obtains a steering calibration command, by a computing device communicatively coupled to a steering mechanism for the vehicle; initiates execution of the steering calibration command, by the computing device via the steering mechanism; determines at least one maximum steering angle of the vehicle, based on execution of the steering calibration command, the at least one maximum steering angle being associated with a maximum potential position of the steering mechanism; identifies a zero-position center of the steering mechanism, based on the at least one maximum steering angle of the vehicle; stores the zero-position center and the at least one maximum steering angle, by the computing device, for future use; and broadcasts the zero-position center and the at least one maximum steering angle, via a Controller Area Network (CAN) bus of the vehicle, by the communication device.

Some embodiments of the present disclosure provide a system for performing operations onboard a vehicle. The system includes: a system memory element; a steering mechanism of the vehicle coupled to wheels of the vehicle, the steering mechanism configured to turn the wheels of the vehicle during operation of the vehicle and during calibration; a communication device configured to receive vehicle system requests for at least one of the zero-position center and the at least one maximum steering angle; and at least one processor, communicatively coupled to the system memory element, the steering mechanism, and the communication device, the at least one processor configured to: obtain a steering calibration command; initiate execution of the steering calibration command, by the steering mechanism; determine at least one maximum steering angle of the vehicle, based on execution of the steering calibration command, the at least one maximum steering angle being associated with a maximum potential position of the steering mechanism; identify a zero-position center of the steering mechanism, based on the at least one maximum steering angle of the vehicle; store the zero-position center and the at least one maximum steering angle, for future use; and initiate a broadcast of the zero-position center and the at least one maximum steering angle, by the communication device via a Controller Area Network (CAN) bus of the vehicle.

Some embodiments of the present disclosure provide a method for performing operations onboard a vehicle. The method obtains a steering calibration command, by a computing device communicatively coupled to a steering mechanism for the vehicle;

initiates execution of the steering calibration command, by the computing device via the steering mechanism; determines at least one maximum steering angle of the vehicle, based on execution of the steering calibration command, the at least one maximum steering angle being associated with a maximum potential position of the steering mechanism, by: determines a first turning position of wheels of the vehicle, wherein the steering mechanism is coupled to the wheels; establishes the first turning position as an origin point that potentially indicates a zero-turning angle for the wheels of the vehicle; initiates execution of the steering calibration command to turn wheels of the vehicle, by the computing device via the steering mechanism, wherein the steering calibration command comprises at least one of a positive calibration command and a negative calibration command; and identifies a maximum achieved position of the wheels after execution of the steering calibration command, wherein the maximum achieved position indicates the at least one maximum steering angle; identifies a zero-position center of the steering mechanism, based on the at least one maximum steering angle of the vehicle; and stores the zero-position center and the at least one maximum steering angle, by the computing device, for future use.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for automatically calibrating a steering system onboard a vehicle. More specifically, the subject matter relates to identifying maximum steering angles for a steering mechanism of the vehicle, and calculating a zero-position center for the steering mechanism, based on the identified maximum steering angles. The zero-position center may be defined as a central, straight-forward position at which the wheels of the vehicle have no steering angle (e.g., a zero-degree angle) and may drive the vehicle forward in a straight line. The maximum steering angles include a maximum left turn steering angle and a maximum right turn steering angle, and may be based on end-of-travel positions (i.e., endpoint positions) of the steering mechanism.

Figure 1:
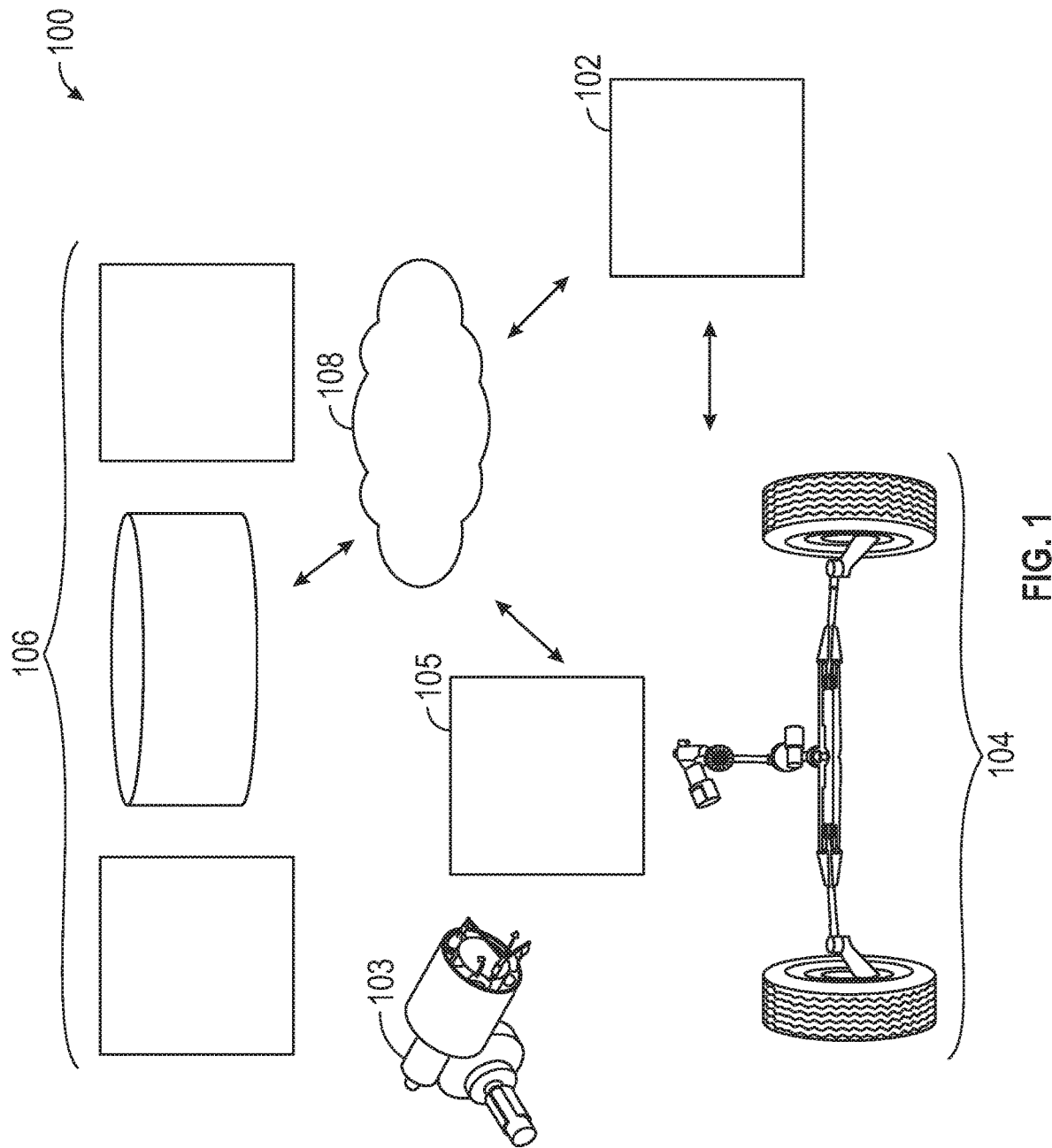
FIG. 1 is a diagram of a steering calibration system, in accordance with the disclosed embodiments.

Turning now to the figures, FIG. 1 is a diagram of a steering calibration system 100, in accordance with the disclosed embodiments. The steering calibration system 100 operates to automatically calibrate a steering mechanism 104 of a vehicle, such that vehicle onboard systems (including autonomous vehicle systems) can access and use the steering calibration data during operation of the vehicle. The steering calibration system 100 may include, without limitation, a computing device 102 that communicates with a steering mechanism 104 and one or more secondary computer systems 106 (e.g., an autonomous driving module onboard the vehicle, a remote and/or vehicle onboard server system, or any other secondary computer system), via a data communication network 108. In practice, certain embodiments of the steering calibration system 100 may include additional or alternative elements and components, as desired for the particular application.

The computing device 102 may be implemented by any vehicle-integrated computing device coupled to, and configured to control, the steering mechanism 104. For example, the computing device 102 may be implemented using an Electronic Control Unit (ECU) integrated onboard the vehicle. In other embodiments, the computing device 102 may be implemented as another type of vehicle-integrated computer system configured to communicate with the steering module (not shown), the steering mechanism 104, and the secondary computer systems 106 using wired and/or wireless connections. Exemplary embodiments of the computing device 102 may be implemented as a steering module coupled to the steering mechanism 104 and an autonomous driving module configured to perform functionality associated with autonomous operations onboard the vehicle. Thus, in exemplary embodiments of the steering calibration system 100, the computing device 102 (i.e., the steering module) may cooperatively function with an autonomous driving module to operate an autonomous vehicle. The autonomous driving module controls motion of the autonomous vehicle, including steering functions performed by the steering mechanism 104, through the transmission of steering commands to the steering module.

The steering mechanism 104 is integrated into a vehicle (not shown). The vehicle may be any one of a number of different types of automobiles (sedans, wagons, trucks, motorcycles, sport-utility vehicles, vans, etc.), watercraft (boats, ships, jet skis, etc.), trains, all-terrain vehicles (snowmobiles, four-wheelers, etc.), military vehicles (Humvees, tanks, trucks, etc.), rescue vehicles (fire engines, ladder trucks, police cars, emergency medical services trucks and ambulances, etc.), and/or any vehicle that includes onboard steering hardware.

The steering mechanism 104 is any driving hardware configured to direct wheels of the vehicle to turn according to a particular angle for a particular period of time in order to guide the vehicle during vehicle motion. Certain embodiments of the steering mechanism 104 may include, without limitation: a steering gear (e.g., a rack and pinion gear), an intermediate shaft, a steering column, a motor 103 to execute motion of the mechanical parts, and the like. The steering mechanism 104 is typically implemented onboard an autonomous vehicle, such that (once calibrated) the steering mechanism 104 functions to automatically steer the vehicle in response to computer-based commands onboard the vehicle. In this scenario, the steering mechanism 104 may or may not include a steering wheel for potential user intervention. In other embodiments, the steering mechanism 104 is implemented onboard a standard vehicle configured for user operation, and the steering mechanism 104 receives manual user input to guide the vehicle during vehicle motion.

The steering mechanism 104 includes a motor 103 configured to turn the road wheels according to a particular angle, and at least one rotational position sensor 105 configured to detect a current rotational position applicable to the current road wheel position. The at least one rotational position sensor 105 may be implemented using (i) rotational sensors 105 coupled to the motor 103, to detect the rotational position of the motor 103, or (ii) rotational sensors 105 coupled to the pinion, to detect the rotational position of the steering gear. As described herein, when the computing device 102 receives an indication that the road wheels are unable to turn any further (i.e., an indication that the road wheels have reached a maximum turning angle), the rotational position of the motor 103 and/or the rotational position of the steering gear is determined to be the maximum turning angle.

The secondary computer systems 106 may be implemented as any computer, ECU, or other type of electronic device configured to provide a steering calibration command for use by the computing device 102 to calibrate the steering mechanism 104. The secondary computer systems 106 may store and provide any type of data used to calibrate the steering mechanism 104. Such data may include, without limitation: previously determined maximum steering angles (e.g., left turn maximum steering angle, right turn maximum steering angle), a previously calculated zero-position center, and other data compatible with the computing device 102.

The computing device 102 communicates with the steering mechanism 104 and the secondary computer systems 106 via wired and/or wireless communication connections, via the data communication network. The data communication network 108 may be any digital or other communications network capable of transmitting messages or data between devices, systems, or components. The data communication network 108 may include wired and/or wireless communication connections. Exemplary embodiments of the data communication network 108 may include one or more data communication buses onboard the vehicle, including but not limited to a Controller Area Network (CAN) bus. In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

During typical operation, the computing device 102 receives a steering calibration command from one of the secondary computer systems 106, wherein the steering calibration command includes a left turn calibration command and a right turn calibration command. The computing device 102 initiates execution of the steering calibration command by the steering mechanism 104, such that the steering mechanism 104 turns the vehicle wheels to the right and left to locate maximum end-of-travel positions and associated maximum steering angles. As described herein, the maximum steering angles are detected by the rotational position sensors coupled to the rotational motor and/or the pinion of the steering mechanism 104. The computing device 102 then uses the maximum end-of-travel positions and associated maximum steering angles to calculate a zero-position center for the vehicle wheels, at which the vehicle wheels are positioned in a straightforward-facing arrangement that includes a zero-degree steering angle. When positioned in the zero-position center, the vehicle is capable of driving in a straight line with no diversion from the straight line using the zero-degree steering angle. The computing device 102 then stores the steering calibration data, for future use and communication to other vehicle systems. Additionally, the computing device 102 broadcasts an output status message according to a timed-interval schedule, onboard the vehicle. The output status message may include a right-turn maximum steering angle, a left-turn maximum steering angle, or the zero-position center, based on the current rotational position of the rotational position sensors.

Figure 2:
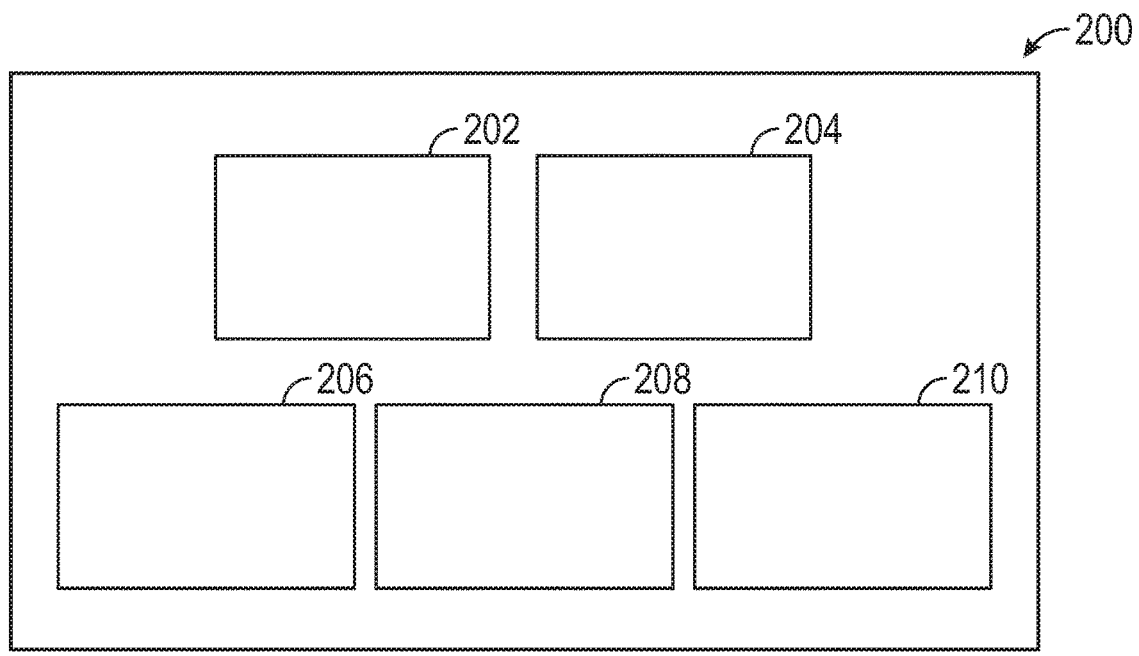
FIG. 2 is a functional block diagram of a computing device, in accordance with the disclosed embodiments.

FIG. 2 is a functional block diagram of a computing device 200, in accordance with the disclosed embodiments. It should be noted that the computing device 200 can be implemented with the computing device 102 depicted in FIG. 1. In this regard, the computing device 200 shows certain elements and components of the computing device 102 in more detail.

The computing device 200 generally includes, without limitation: at least one processor 202; system memory 204; a maximum mechanical steering positions module 206; a center steering position module 208; and a communication device 210. These elements and features of the computing device 200 may be operatively associated with one another, coupled to one another, or otherwise configured to cooperate with one another as needed to support the desired functionality—in particular, calibrating a steering mechanism onboard a vehicle prior to and/or during operation of the vehicle, as described herein. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that relate to the steering calibration techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to the system memory 204. The system memory 204 is configured to store any obtained or generated data associated with automatically calibrating the steering mechanism onboard the vehicle (e.g., maximum steering angles for left turn and right turn, and a zero-position center for the wheels coupled to the steering mechanism). The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The maximum mechanical steering positions module 206 is configured to determine a left turn maximum steering angle and a right turn maximum steering angle, using a steering calibration command. The steering calibration command includes a left turn calibration command (to turn the vehicle wheels to the left according to maximum possible turn value) and a right turn calibration command (to turn the vehicle wheels to the right according to the maximum possible turn value). The wheels are generally in an unknown position when the calibration process begins. In other words, the wheels may be turned toward the right or the left, and when turned, the wheels may be directed to the right or left by varying degrees. The maximum mechanical steering positions module 206 is thus configured to turn the wheels (to the right or to the left) using a maximum possible turn that the steering mechanism is capable of performing, and to identify end-of-travel positions on the left and the right sides of the steering mechanism. The right and left maximum possible turn values are predefined values that have been previously determined and stored for use onboard a specific type of vehicle. The right and left maximum possible turn values are based on the amount of travel the steering system permits, and may be associated with a particular model of vehicle.

When beginning from an existing right-turn condition (i.e., when the wheels are slightly or considerably turned to the right), the maximum possible turn toward the right direction is likely to turn the wheels to a maximum potential wheel position on the right. However, when beginning from an existing left-turn condition (i.e., when the wheels are slightly or considerably turned to the left), the maximum possible turn toward the right direction is unlikely to turn the wheels to a maximum potential wheel position on the right. In this scenario, the maximum mechanical steering positions module 206 is configured to turn the wheels according to the maximum possible turn, identify the new position of the wheels after turning according to the maximum possible turn, and execute the steering calibration command again from the new position, to reach the end-of-travel position on the right. Once the end-of-travel positions are determined, the maximum mechanical steering positions module 206 is configured to identify corresponding maximum steering angles for the steering mechanism.

The center steering position module 208 is suitably configured to identify a zero-position center of the steering mechanism, using the left turn maximum steering angle and the right turn maximum steering angle (obtained by the maximum mechanical steering positions module 206). The zero-position center is a position at which the vehicle wheels are positioned in a straightforward-facing arrangement that includes a zero-degree steering angle. When positioned in the zero-position center, the vehicle is capable of driving in a straight line with no diversion from the straight line using the zero-degree steering angle. The center steering position module 208 calculates the zero-position center using the left-turn and right-turn maximum steering angles and a maximum rack travel value for the steering mechanism of the vehicle. The maximum rack travel value is the upper tolerance travel distance of the steering rack, wherein the maximum rack travel value is a predefined value generally obtained from a vehicle specification or other vehicle-specific data source. In the exemplary embodiments described herein, the zero-position center is calculated using the following formula: Zero-position center=maximum steering angle−[0.5*((maximum rack travel value/2)+maximum steering angle)].

In practice, the maximum mechanical steering positions module 206 and/or the center steering position module 208 may be implemented with (or cooperate with) the at least one processor 202 to perform at least some of the functions and operations described in more detail herein. In this regard, the maximum mechanical steering positions module 206 and/or the center steering position module 208 may be realized as suitably written processing logic, application program code, or the like.

The communication device 210 is suitably configured to communicate data between the computing device 200 and one or more secondary computer systems (e.g., an autonomous driving module, one or more servers, Electronic Control Units (ECUs)), one or more vehicle onboard systems, or the like. The communication device 210 may transmit and receive communications over a wireless local area network (WLAN), the Internet, a satellite uplink/downlink, a cellular network, a broadband network, a wide area network, vehicle-specific communication connections (e.g., a Controller Area Network (CAN) bus), or the like. As described in more detail below, data received by the communication device 210 may include, without limitation: a steering calibration command and any data applicable to calibrating a steering mechanism onboard the vehicle. Data provided by the communication device 210 may include, without limitation: a left turn maximum steering angle, a right turn maximum steering angle, a zero-position center of the steering mechanism, and the like.

Figure 3:
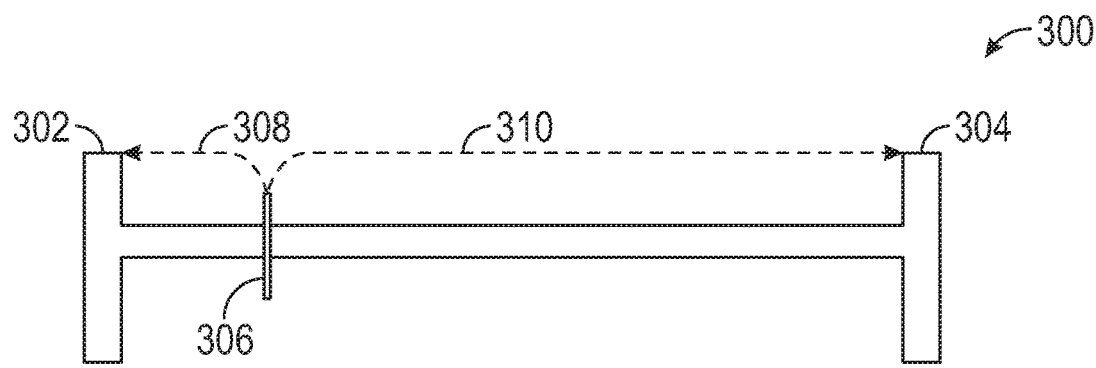
FIG. 3 is a diagram of steering calibration system operations, in accordance with the disclosed embodiments.

FIG. 3 is a diagram of steering calibration system operations, in accordance with the disclosed embodiments. Illustrated steering calibration system operations may include, without limitation, executing a steering calibration command that includes a left turn steering calibration command to turn the wheels to the left and a right turn steering calibration command to turn the wheels to the right.

As shown, a steering mechanism 300 includes a maximum potential left position 302 and a maximum potential right position 304. In this scenario, the wheels are currently situated at a first position 306. The first position 306 is directed toward the left of the steering mechanism 300. However, at the beginning of the calibration process, it is unknown whether the first position 306 is directed toward the left of the steering mechanism 300, directed toward the right of the steering mechanism 300, or positioned in the center of the steering mechanism 300 facing directly straight-forward without a steering angle. The unknown first position 306 of the wheels is used as an origin point from which the calibration process begins. The calibration process begins by receiving the steering calibration command, and turning the wheels according to the steering calibration command. The steering calibration command may include a left turn calibration command and a right turn calibration command and/or a positive calibration command and a negative calibration command.

Here, the calibration process performs a left calibration turn 308 by turning the wheels to the left using a maximum possible turn toward the left direction. The maximum possible turn is the maximum turn magnitude for the steering mechanism 300. Because the first position 306 (i.e., the origin position) of the wheels is directed toward the left of the steering mechanism 300, the maximum possible turn is capable of reaching the maximum potential left position 302 for the wheels. The calibration process also performs a right calibration turn 310 by turning the wheels to the right using a maximum possible turn toward the right direction. The maximum possible turn is the maximum turn magnitude for the steering mechanism 300. In this case, even though the first position 306 (i.e., the origin position) of the wheels is directed toward the left of the steering mechanism 300, the maximum possible turn is capable of reaching the maximum potential right position 304 for the wheels. However, a different scenario is described below with regard to FIG. 4.

Figure 4:
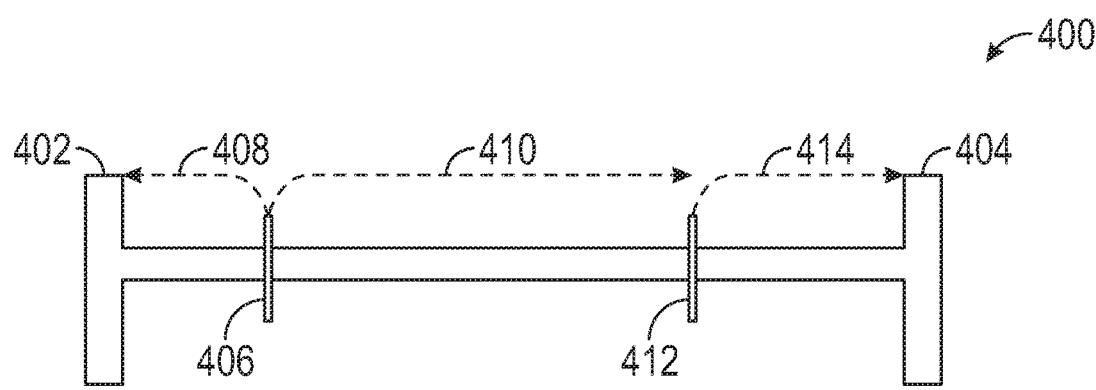
FIG. 4 is a second diagram of steering calibration system operations, in accordance with the disclosed embodiments.

FIG. 4 is a second diagram of steering calibration system operations, in accordance with the disclosed embodiments. As shown, a steering mechanism 400 includes a maximum potential left position 402 and a maximum potential right position 404. In this scenario, the wheels are currently situated at a first position 406. The first position 406 is directed toward the left of the steering mechanism 400.

However, at the beginning of the calibration process, it is unknown whether the first position 406 is directed toward the left of the steering mechanism 400, directed toward the right of the steering mechanism 400, or positioned in the center of the steering mechanism 400 facing directly straight-forward without a steering angle. The unknown first position 406 of the wheels is used as an origin point from which the calibration process begins. The calibration process begins by receiving the steering calibration command, and turning the wheels according to the steering calibration command. The steering calibration command may include a left turn calibration command and a right turn calibration command and/or a positive calibration command and a negative calibration command.

Here, the calibration process performs a left calibration turn 408 by turning the wheels to the left using a maximum possible turn toward the left direction. The maximum possible turn is the maximum turn magnitude for the steering mechanism 400. Because the first position 406 (i.e., the origin position) of the wheels is directed toward the left of the steering mechanism 400, the maximum possible turn is capable of reaching the maximum potential left position 402 for the wheels. The calibration process also performs a right calibration turn 410 by turning the wheels to the right using a maximum possible turn toward the right direction. The maximum possible turn is the maximum turn magnitude for the steering mechanism 400. In this case, because the first position 406 (i.e., the origin position) of the wheels is directed toward the left of the steering mechanism 400, the maximum possible turn is not capable of reaching the maximum potential right position 404 for the wheels. Instead, the maximum possible turn reaches a second position 412.

In this case, the calibration process recognizes that the second position 412 is not the maximum potential right position 404, and uses the second position 412 as a new origin point from which to execute the steering calibration command again, in order to reach and identify the maximum potential right position 404. After establishing the second position 412 as the new origin point, the calibration process executes the steering calibration command again, to turn the wheels the maximum possible turn to the right (i.e., right calibration turn 414). During this second execution of the steering calibration command, the maximum possible right turn is sufficient to reach the maximum potential right position 404.

Figure 5:
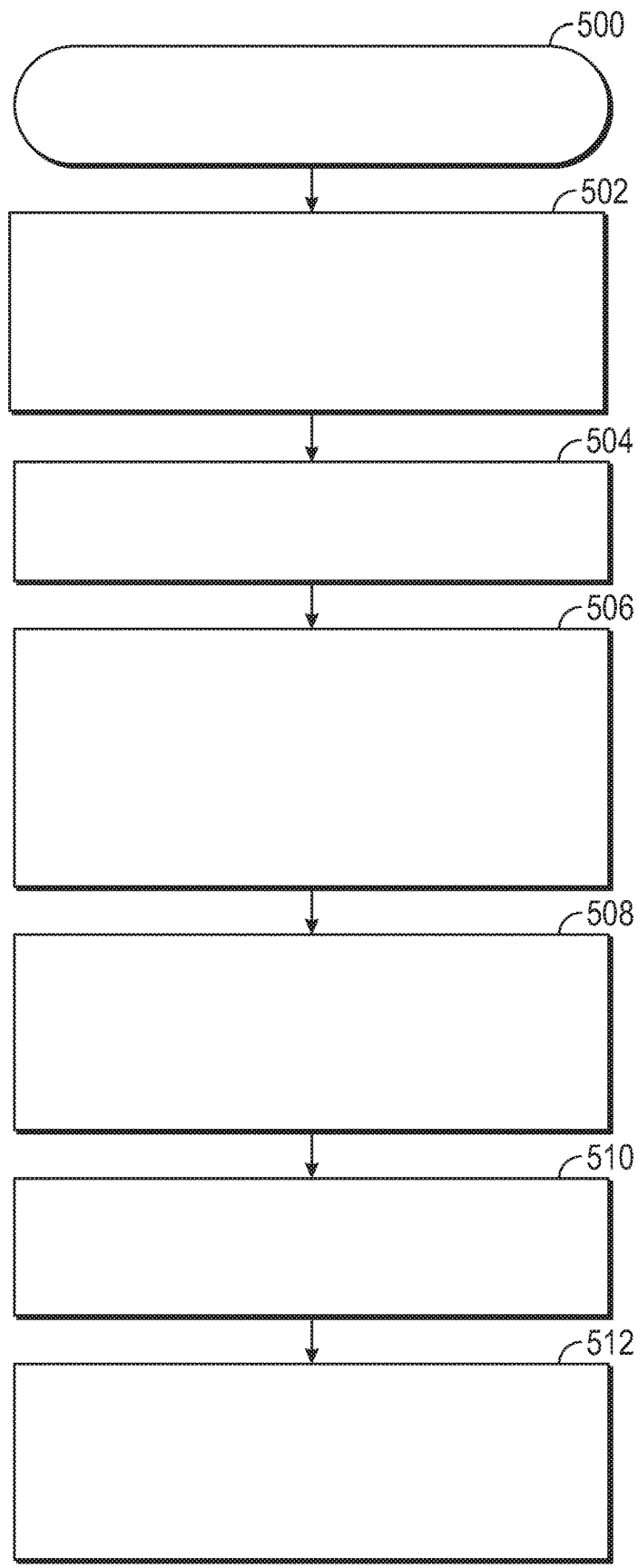
FIG. 5 is a flow chart that illustrates an embodiment of a process for performing steering calibration operations onboard a vehicle, in accordance with the disclosed embodiments.

FIG. 5 is a flow chart that illustrates an embodiment of a process 500 for performing steering calibration operations onboard a vehicle, in accordance with the disclosed embodiments. First, the process 500 obtains a steering calibration command, by a computing device communicatively coupled to a steering mechanism for the vehicle (step 502). The steering calibration command is a command to turn the wheels of the vehicle using a maximum possible turn magnitude, in an attempt to reach and identify a maximum potential turned position for the wheels. In some embodiments, the steering calibration command includes a left steering calibration command (to turn the wheels to the left) and a right steering calibration command (to turn the wheels to the right). In other embodiments, the steering calibration command includes a positive steering calibration command and a negative steering calibration command, wherein the positive steering calibration command may be a command to turn the wheels to the left or to the right, and wherein the negative steering calibration command may be a command to turn the wheels to the left or to the right. The steering calibration command may be generated by the computing device coupled to the steering mechanism (see reference 102, FIG. 1), or a secondary computer system that may be located onboard the vehicle or located external to the vehicle (see reference 106, FIG. 1). The process 500 obtains the steering calibration command via wired and/or wireless communication connection.

Next, the process 500 initiates execution of the steering calibration command, by the computing device via the steering mechanism (step 504). In this step, the process 500 causes the steering mechanism to turn the wheels to the right or to the left, according to the maximum magnitude of turn specified by the obtained steering calibration command. As described previously, the maximum magnitude of turn is a predefined value that is associated with a particular vehicle model. The steering calibration command includes the maximum magnitude of turn and a direction to turn the wheels to the right or to the left. In some embodiments, the steering calibration command specifies a positive direction of turn, and in other embodiments, the steering calibration command specifies a negative direction of turn. Whether the positive direction or the negative direction indicates a left direction or a right direction is an implementation detail configured by developers at design time. For purposes of the present disclosure, the positive direction may indicate a left turn direction or a right turn direction, and the negative direction may indicate a left turn direction or a right turn direction, wherein the positive direction and the negative direction comprise opposite directions.

The process 500 then determines at least one maximum steering angle of the vehicle, based on execution of the steering calibration command (step 506). One suitable methodology for determining at least one maximum steering angle of the vehicle is described below with reference to FIG. 6. Here, the process 500 first identifies the maximum potential position of the steering mechanism, and the at least one maximum steering angle is associated with a maximum potential position of the steering mechanism.

Next, the process 500 identifies a zero-position center of the steering mechanism, based on the at least one maximum steering angle of the vehicle (step 508). The zero-position center may be defined as a central, straight-forward position at which the wheels of the vehicle have no steering angle (e.g., a zero-degree angle) and may drive the vehicle forward in a straight line.

In exemplary embodiments, the process 500 has identified a left-turn maximum steering angle and a right-turn maximum steering angle, which are referred to as the maximum steering angles (i.e., the at least one maximum steering angle). To calculate the zero-position center, the process 500 uses the maximum steering angles and a maximum rack travel value for the steering mechanism of the vehicle. The maximum rack travel value is the upper tolerance travel distance of the steering rack, wherein the maximum rack travel value is a predefined value generally obtained from a vehicle specification or other vehicle-specific data source. In the exemplary embodiments described herein, the zero-position center is calculated using the following formula: Zero-position center=maximum steering angle−[0.5* ((maximum rack travel value/2)+maximum steering angle)].

The process 500 also stores the zero-position center and the at least one maximum steering angle, by the computing device, for future use (step 510). The zero-position center and the maximum steering angles (e.g., the left turn maximum steering angle, the right turn maximum steering angle) may be used by various vehicle onboard systems during performance of vehicle operations.

Figure 6:
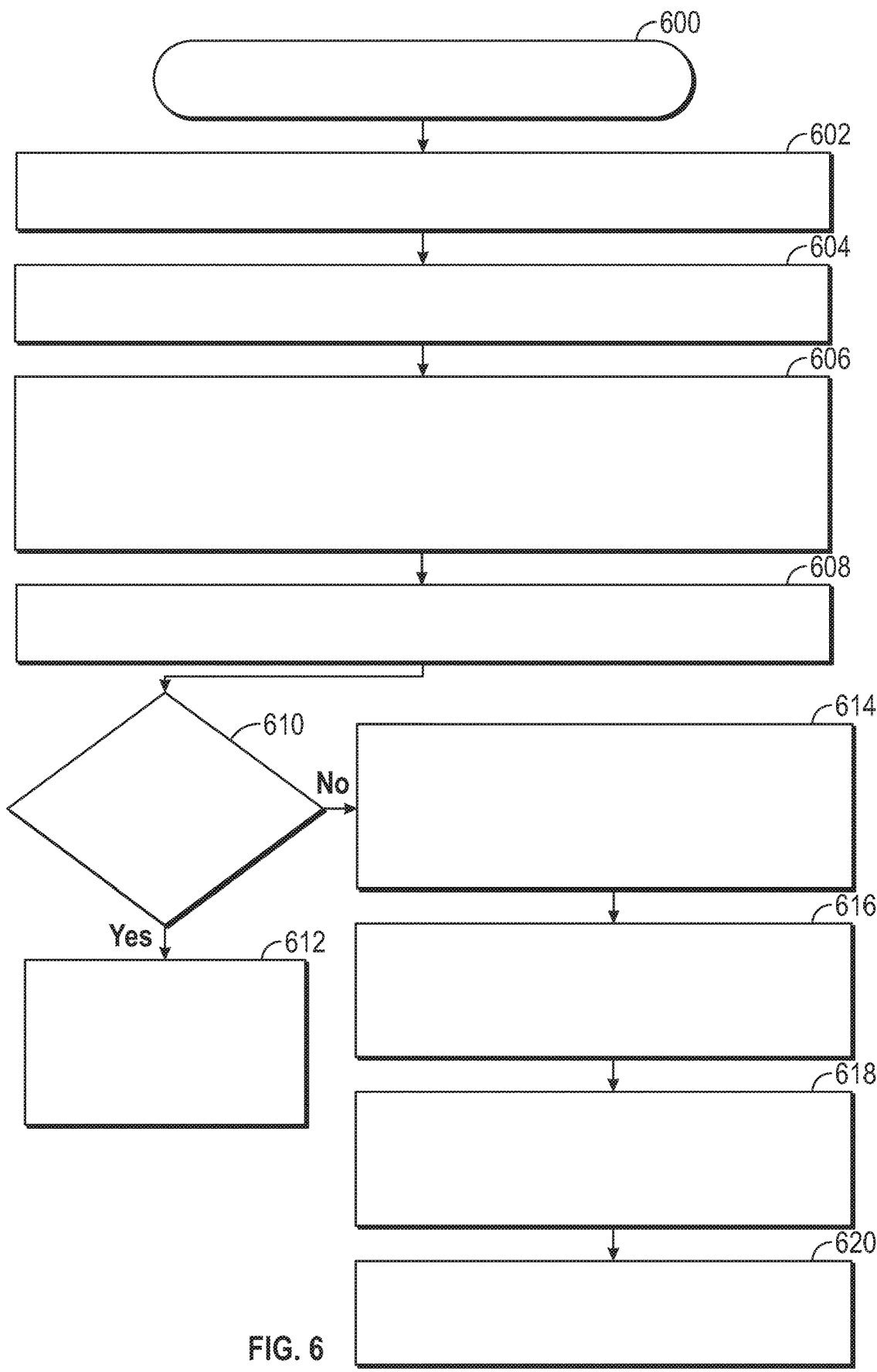
FIG. 6 is a flow chart that illustrates an embodiment of a process for determining a maximum steering angle of the vehicle, in accordance with the disclosed embodiments.

The process 500 broadcasts the zero-position center and the at least one maximum steering angle, via a Controller Area Network (CAN) bus of the vehicle, by the communication device (step 512). In some embodiments, the process 500 may receive one or more vehicle system requests for the steering calibration data, including the zero-position center and the maximum steering angles (e.g., the left turn maximum steering angle, the right turn maximum steering angle). In response to receiving a vehicle system request, the process 500 broadcasts the zero-position center data and the maximum steering angle data via the Controller Area Network (CAN) bus of the vehicle, transmits the zero-position center data and the maximum steering angle data directly via a wired and/or wireless connection, communicates the zero-position center data and the maximum steering angle via any other communication method for data transmission to integrated systems onboard the vehicle. The zero-position enter and the at least one maximum steering angle may be obtained, via the CAN broadcast or other direct transmission, by the autonomous driving module (see FIG. 1) for use in FIG. 6 is a flow chart that illustrates an embodiment of a process 600 for determining a maximum steering angle of the vehicle, in accordance with the disclosed embodiments. It should be appreciated that the process 600 described in FIG. 6 represents one embodiment of step 506 described above in the discussion of FIG. 5, including additional detail.

The process 600 determines a first turning position of wheels of the vehicle, wherein the steering mechanism is coupled to the wheels (step 602). The steering mechanism of the vehicle includes a maximum potential left position and a maximum potential right position. Here, the wheels are currently situated at a first turning position. The first turning position may be directed toward the left of the steering mechanism, directed toward the right of the steering mechanism, or directed straightforward at the center position.

The process 600 establishes a first turning position as an origin point that potentially indicates a zero-turning angle for the wheels of the vehicle (step 604). At the beginning of the calibration process, it is unknown whether the first turning position is directed toward the left of the steering mechanism, directed toward the right of the steering mechanism, or positioned in the center of the steering mechanism facing directly straight-forward without a steering angle. The unknown first position of the wheels is used as an origin point from which the calibration process begins.

The process 600 initiates execution of the steering calibration command to turn the wheels of the vehicle, by the computing device via the steering mechanism, wherein the steering calibration command comprises at least one of a positive calibration command and a negative calibration command (step 606). The calibration process begins by receiving the steering calibration command, and turning the wheels according to the steering calibration command. The steering calibration command may include a left turn calibration command and a right turn calibration command and/or a positive calibration command and a negative calibration command.

The process 600 identifies a maximum achieved position of the wheels after execution of the steering calibration command (step 608). One suitable methodology for identifying a maximum achieved position of the wheels after execution of the steering calibration command is described below with reference to FIG. 7. Here, the calibration process may perform a left calibration turn by turning the wheels to the left using a maximum possible turn toward the left direction, and the calibration process also performs a right calibration turn by turning the wheels to the right using a maximum possible turn toward the right direction. The maximum possible turn is the maximum turn magnitude for the steering mechanism.

The process 600 compares the maximum achieved position to the maximum potential position, to determine whether the maximum achieved position is equal to the maximum potential position (decision 610). If the maximum achieved position is equal to the maximum potential position, then the process 600 determines that the end-of-travel position has been reached. When the maximum achieved position is equal to the maximum potential position (the "Yes" branch of 610), the process 600 identifies the at least one maximum steering angle, based on the maximum achieved position.

However, when the maximum achieved position is not equal to the maximum potential position (the "No" branch of 610), then the process 600 determines that the end-of-travel position has not been reached. The process 600 establishes the maximum achieved position as a new origin point that potentially indicates the zero-turning angle for the wheels of the vehicle, for continued calibration of the steering mechanism (step 614).

The process 600 then initiates execution of the steering calibration command from the new origin point, to turn the wheels of the vehicle (step 616). In this case, the calibration process recognizes that the maximum achieved position is not the maximum potential position, and uses the maximum achieved position as a new origin point from which to execute the steering calibration command again, in order to reach and identify the maximum potential position. After establishing the second position (e.g., the maximum achieved position) as the new origin point, the calibration process executes the steering calibration command again, to turn the wheels the maximum possible turn to the right and/or to the left. During this second execution of the steering calibration command, the maximum possible right turn is sufficient to reach the maximum potential right or left position.

Figure 7:
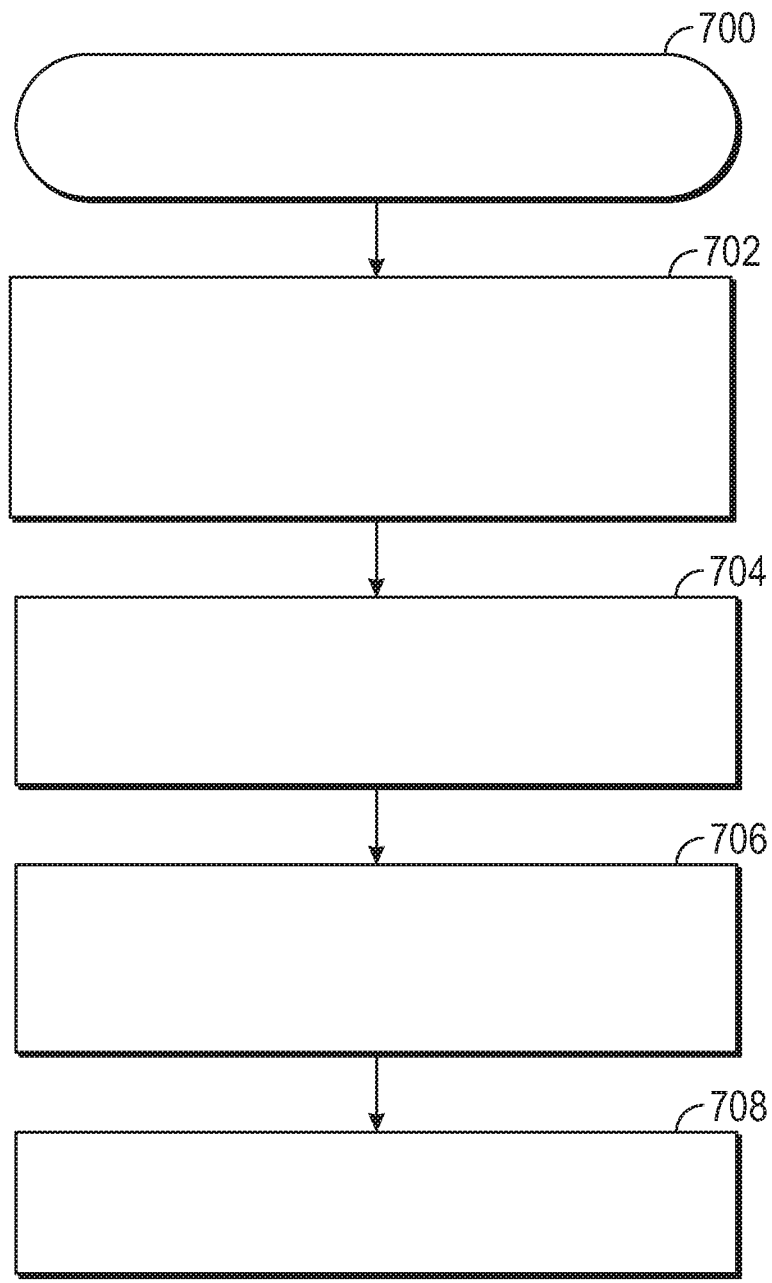
FIG. 7 is a flow chart that illustrates an embodiment of a process for identifying a maximum achieved position for wheels of the vehicle, in accordance with the disclosed embodiments.

The process 600 identifies a second maximum achieved position of the wheels after execution of the steering calibration command from the new origin point (step 618). One suitable methodology for identifying a maximum achieved position of the wheels after execution of the steering calibration command is described below with reference to FIG. 7. The process 600 identifies the at least one maximum steering angle for the vehicle, based on the second maximum achieved position (step 620), FIG. 7 is a flow chart that illustrates an embodiment of a process 700 for identifying a maximum achieved position for wheels of the vehicle, in accordance with the disclosed embodiments. It should be appreciated that the process 700 described in FIG. 7 represents one embodiment of steps 608 and/or 618 described above in the discussion of FIG. 6, including additional detail.

The process 700 receives sensor data during execution of the steering calibration command, by the computing device via a sensor coupled to the wheels, the sensor data indicating movement of the wheels (step 702). Sensor data may include velocity data, acceleration data, torque data, steering angle magnitude data, force data, and/or power data. The process 700 may obtain the sensor data using a linear position sensor, an accelerometer, a rotational sensor, a laser, a strain gauge, a rotational angle of the motor coupled to the steering mechanism, current and voltage sensors, or the like.

The process 700 then receives an indication that the wheels are unable to continue turning, during execution of the steering calibration command, based on the sensor data (step 704). The process 700 is continuously receiving sensor data signaling that the wheels are currently in motion. Here, the process 700 detects changes to the sensor data indicating that the wheels have stopped moving. The indication may be that the sensor data drops to zero, the sensor data may remain stable for a particular period of time, the sensor data may "spike" (i.e., dramatically increase and decrease by a large magnitude), the sensor data may cross a threshold value indicating a lack of movement of the wheels, or the like.

The process 700 identifies a position of the wheels at a time point of receiving the indication, wherein the maximum achieved position comprises the position (step 706). The wheels are turning in response to the obtained steering calibration command, and the process 700 has identified a change in the received sensor data indicating that the wheels have stopped turning because the maximum turn has been executed and the wheel is currently located at the maximum potential turn position (left or right).

The process 700 identifies the at least one maximum steering angle for the vehicle, based on the maximum achieved position (step 708). Each possible wheel position is associated with a turn angle or steering angle. When the wheels are positioned at the maximum potential turn position, the process 700 identifies the current turn angle as the maximum steering angle. Here, the process 700 detects a current rotational angle of the rotational sensors of motor and/or of the pinion of the steering mechanism, at the maximum achieved position indicated by the change in the received sensor data. The current rotational angle is the at least one maximum steering angle for the vehicle.

The various tasks performed in connection with processes 500-700 may be performed by software, hardware, firmware, or any combination thereof. For illustrative purposes, the preceding descriptions of processes 500-700 may refer to elements mentioned above in connection with FIGS. 1-4. In practice, portions of processes 500-700 may be performed by different elements of the described system, e.g., a computing device, a steering mechanism, or one or more vehicle onboard sensors. It should be appreciated that processes 500-700 may include any number of additional or alternative tasks, the tasks shown in FIGS. 5-7 need not be performed in the illustrated order, and processes 500-700 may be incorporated into a more comprehensive procedure or process having additional functionality not described in detail herein. Moreover, one or more of the tasks shown in FIGS. 5-7 could be omitted from particular embodiments of processes 500-700 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for performing operations by a computing device onboard a vehicle, the method comprising:
   receiving, by the computing device, a steering calibration command generated by a secondary computer communicatively coupled to the computing device and a steering mechanism for the vehicle, the steering calibration command including a left turn command and a right turn command;
   controlling, by the computing device, the steering mechanism based on the left turn command and the right turn command of the steering calibration command;
   determining at least one maximum steering angle of the vehicle, based on execution of the steering calibration command, the at least one maximum steering angle being associated with a maximum potential position of the steering mechanism;
   identifying a zero-position center of the steering mechanism, based on the at least one maximum steering angle of the vehicle;
   storing the zero-position center and the at least one maximum steering angle, by the computing device, for future use; and
   broadcasting the zero-position center and the at least one maximum steering angle, via a Controller Area Network (CAN) bus of the vehicle, by a communication device.

2. The method of claim 1, wherein determining the at least one maximum steering angle of the vehicle further comprises:
   determining a first turning position of wheels of the vehicle, wherein the steering mechanism is coupled to the wheels;
   establishing the first turning position as an origin point that potentially indicates a zero-turning angle for the wheels of the vehicle;
   initiating execution of the steering calibration command to turn the wheels of the vehicle, by the computing device via the steering mechanism, wherein the steering calibration command comprises at least one of a positive calibration command and a negative calibration command; and
   identifying a maximum achieved position of the wheels after execution of the steering calibration command, wherein the maximum achieved position indicates the at least one maximum steering angle.

3. The method of claim 2, further comprising:
   comparing the maximum achieved position to the maximum potential position; and
   when the maximum achieved position is not equal to the maximum potential position,
      establishing the maximum achieved position as a new origin point that potentially indicates the zero-turning angle for the wheels of the vehicle, for continued calibration of the steering mechanism, wherein the maximum achieved position includes a second turning position of the wheels of the vehicle; and
      determining the at least one maximum steering angle, based on the new origin point.

4. The method of claim 3, wherein determining the at least one maximum steering angle, based on the new origin point, further comprises:
   initiating execution of the steering calibration command from the new origin point;
   identifying a second maximum achieved position of the wheels after execution of the steering calibration command from the new origin point; and
   identifying the at least one maximum steering angle for the vehicle, based on the second maximum achieved position.

5. The method of claim 2, further comprising:
   comparing the maximum achieved position to the maximum potential position; and
   when the maximum achieved position is equal to the maximum potential position,
      identifying the at least one maximum steering angle for the vehicle, based on the maximum achieved position.

6. The method of claim 2, wherein identifying the maximum achieved position further comprises:
   receiving sensor data during execution of the steering calibration command, by the computing device via a sensor coupled to the wheels, the sensor data indicating movement of the wheels;
   receiving an indication that the wheels are unable to continue turning, during execution of the steering calibration command, based on the sensor data;
   identifying a position of the wheels at a time point of receiving the indication, wherein the maximum achieved position comprises the position; and
   identifying the at least one maximum steering angle for the vehicle, based on the maximum achieved position.

7. The method of claim 6, wherein the sensor data comprises at least one of velocity data, acceleration data, torque data, steering angle magnitude data, force data, and power data.

8. A system for performing operations onboard a vehicle, the system comprising:
   a system memory element;

a steering mechanism of the vehicle coupled to wheels of the vehicle, the steering mechanism configured to turn the wheels of the vehicle during operation of the vehicle and during calibration;

a communication device configured to receive vehicle system requests for at least one of a zero-position center and at least one maximum steering angle; and at least one processor, communicatively coupled to the system memory element, the steering mechanism, and the communication device, the at least one processor configured to:

receive a steering calibration command from a secondary computer, the steering calibration command including a left turn command and a right turn command;

control movement of the steering mechanism based on the left turn command and the right turn command;

determine the at least one maximum steering angle of the vehicle, based on the left turn command and the right turn command, the at least one maximum steering angle being associated with a maximum potential position of the steering mechanism;

identify the zero-position center of the steering mechanism, based on the at least one maximum steering angle of the vehicle;

store the zero-position center and the at least one maximum steering angle, for future use; and initiate a broadcast of the zero-position center and the at least one maximum steering angle, by the communication device via a Controller Area Network (CAN) bus of the vehicle.

9. The system of claim 8, wherein the at least one processor is further configured to determine the at least one maximum steering angle of the vehicle further, by:

determining a first turning position of wheels of the vehicle, wherein the steering mechanism is coupled to the wheels;

establishing the first turning position as an origin point that potentially indicates a zero-turning angle for the wheels of the vehicle;

initiating execution of the steering calibration command to turn wheels of the vehicle, via the steering mechanism, wherein the steering calibration command comprises at least one of a positive calibration command and a negative calibration command; and identifying a maximum achieved position of the wheels after execution of the steering calibration command, wherein the maximum achieved position indicates the at least one maximum steering angle.

10. The system of claim 9, wherein the at least one processor is further configured to:

compare the maximum achieved position to the maximum potential position; and when the maximum achieved position is not equal to the maximum potential position, establish the maximum achieved position as a new origin point that potentially indicates the zero-turning angle for the wheels of the vehicle, for continued calibration of the steering mechanism, wherein the maximum achieved position includes a second turning position of the wheels of the vehicle; and determine the at least one maximum steering angle, based on the new origin point.

11. The system of claim 10, wherein the at least one processor is further configured to determine the at least one maximum steering angle, based on the new origin point, by:

initiating execution of the steering calibration command from the new origin point;

identifying a second maximum achieved position of the wheels after execution of the steering calibration command from the new origin point; and identifying the at least one maximum steering angle for the vehicle, based on the second maximum achieved position.

12. The system of claim 9, wherein the at least one processor is further configured to:

compare the maximum achieved position to the maximum potential position; and when the maximum achieved position is equal to the maximum potential position, identify the at least one maximum steering angle for the vehicle, based on the maximum achieved position.

13. The system of claim 9, further comprising a sensor coupled to the steering mechanism, wherein the steering mechanism comprises the wheels of the vehicle;

wherein the at least one processor is further configured to identify the maximum achieved position, by:

receiving sensor data during execution of the steering calibration command, via the sensor, the sensor data indicating movement of the wheels;

receiving an indication that the wheels are unable to continue turning, during execution of the steering calibration command, based on the sensor data;

identifying a position of the wheels at a time point of receiving the indication, wherein the maximum achieved position comprises the position; and identifying the at least one maximum steering angle for the vehicle, based on the maximum achieved position.

14. The system of claim 13, wherein the sensor data comprises at least one of velocity data, acceleration data, torque data, steering angle magnitude data, force data, and power data.

15. A method for performing operations by a computing device onboard a vehicle, the method comprising:

receiving, by the computing device, a steering calibration command generated by a secondary computer communicatively coupled to the computing device and a steering mechanism for the vehicle, the steering calibration command including a left turn command and a right turn command;

controlling, by the computing device, the steering mechanism based on the left turn command and the right turn command of the steering calibration command;

determining at least one maximum steering angle of the vehicle, based on execution of the steering calibration command, the at least one maximum steering angle being associated with a maximum potential position of the steering mechanism, by:

determining a first turning position of wheels of the vehicle, wherein the steering mechanism is coupled to the wheels;

establishing the first turning position as an origin point that potentially indicates a zero-turning angle for the wheels of the vehicle;

initiating execution of the steering calibration command to turn wheels of the vehicle, by the computing device via the steering mechanism, wherein the steering calibration command comprises at least one of a positive calibration command and a negative calibration command; and identifying a maximum achieved position of the wheels after execution of the steering calibration command, wherein the maximum achieved position indicates the at least one maximum steering angle;

identifying a zero-position center of the steering mechanism, based on the at least one maximum steering angle of the vehicle; and storing the zero-position center and the at least one maximum steering angle, by the computing device, for future use.

16. The method of claim 15, wherein identifying the maximum achieved position further comprises:

receiving velocity data during execution of the steering calibration command, via a sensor coupled to the wheels, the velocity data indicating movement of the wheels;

receiving an indication that the wheels are unable to continue turning, during execution of the steering calibration command, based on the velocity data; and identifying a position of the wheels at a time point of receiving the indication, wherein the maximum achieved position comprises the position, and wherein the maximum achieved position indicates the at least one maximum steering angle.

17. The method of claim 15, wherein identifying the maximum achieved position further comprises:

receiving steering angle magnitude data during execution of the steering calibration command, via a rotational angle of a motor of the steering mechanism, the steering angle magnitude data indicating movement of the wheels;

receiving an indication that the wheels are unable to continue turning, during execution of the steering calibration command, based on the steering angle magnitude data; and identifying a position of the wheels at a time point of receiving the indication, wherein the maximum achieved position comprises the position, and wherein the maximum achieved position indicates the at least one maximum steering angle.

18. The method of claim 15, wherein identifying the maximum achieved position further comprises:

receiving torque data during execution of the steering calibration command, via a torque sensor of the steering mechanism, the torque data indicating movement of the wheels;

receiving an indication that the wheels are unable to continue turning, during execution of the steering calibration command, based on the torque data; and identifying a position of the wheels at a time point of receiving the indication, wherein the maximum achieved position comprises the position, and wherein the maximum achieved position indicates the at least one maximum steering angle.

19. The method of claim 15, wherein identifying the maximum achieved position further comprises:

receiving acceleration data during execution of the steering calibration command, via a sensor coupled to the wheels, the acceleration data indicating movement of the wheels;

receiving an indication that the wheels are unable to continue turning, during execution of the steering calibration command, based on the acceleration data; and identifying a position of the wheels at a time point of receiving the indication, wherein the maximum achieved position comprises the position, and wherein the maximum achieved position indicates the at least one maximum steering angle.

20. The method of claim 15, wherein identifying the maximum achieved position further comprises:

receiving force data during execution of the steering calibration command, via a sensor coupled to the wheels, the force data indicating movement of the wheels;

receiving an indication that the wheels are unable to continue turning, during execution of the steering calibration command, based on the force data; and identifying a position of the wheels at a time point of receiving the indication, wherein the maximum achieved position comprises the position, and wherein the maximum achieved position indicates the at least one maximum steering angle.

* * * * *